United States Patent [19]
Lee et al.

[11] 4,200,667
[45] Apr. 29, 1980

[54] PROCESS FOR PRODUCING A PRESSURE-SENSITIVE CARBONLESS COPY SHEET USING MICROCAPSULES FORMED IN SITU IN A RADIATION CURABLE BINDER

[75] Inventors: Yu-Sun Lee, Parma, Ohio; Dale R. Shackle, Scottsboro, Ala.

[73] Assignee: The Mead Corporation, Dayton, Ohio

[21] Appl. No.: 894,405

[22] Filed: Apr. 7, 1978

Related U.S. Application Data

[62] Division of Ser. No. 773,901, Mar. 3, 1977, abandoned.

[51] Int. Cl.² ............................................. B05D 3/06
[52] U.S. Cl. ....................................... 427/44; 106/19; 106/20; 106/21; 106/22; 427/54.1; 427/150; 427/151; 427/152
[58] Field of Search ............................... 427/150–152, 427/44, 54; 106/19–22

[56] References Cited

U.S. PATENT DOCUMENTS

| | | | |
|---|---|---|---|
| 3,016,308 | 1/1962 | McCaulay | 106/22 |
| 3,429,827 | 2/1969 | Ruus | 106/19 |
| 3,886,084 | 5/1975 | Vassiliades | 106/22 |
| 3,900,669 | 8/1975 | Kiritani | 282/27.5 |

*Primary Examiner*—Ronald H. Smith
*Assistant Examiner*—Janyce A. Bell
*Attorney, Agent, or Firm*—Stephen H. Cagle; Charles N. Shane, Jr.; Wilson G. Palmer

[57] ABSTRACT

A process is provided for producing a coating composition containing microcapsules having a hydrophilic core material for use in the manufacture of pressure-sensitive carbonless transfer papers comprising the following steps of preparing a hydrophobic emulsion component by dispersing an emulsifier in a radiation curable hydrophobic liquid, preparing a hydrophilic emulsion component by dispersing a first wall-forming material in a hydrophilic liquid containing at least one chromogenic material being soluble in the hydrophilic liquid, the first wall-forming material being reactive with a second wall-forming material to form a polymeric capsule wall, the polymeric capsule wall being substantially insoluble in the hydrophilic and the hydrophobic liquids and mixing the hydrophobic emulsion component with the hydrophilic emulsion component to form an emulsion containing droplets of the hydrophilic emulsion component dispersed in the hydrophobic emulsion component. The second wall-forming material is then added to the emulsion with agitation, the agitation continuing for a period of time sufficient to allow the first and second wall-forming materials to react to form a dispersion of microcapsules in the hydrophobic emulsion component, the microcapsules having cell walls substantially impermeable to the hydrophobic and the hydrophilic liquids. A process is provided for producing a pressure-sensitive carbonless transfer paper comprising the further steps of applying the coating composition to a substrate and curing the coating composition by subjecting the coating composition on the substrate to radiation for a period of time sufficient to cure the radiation curable hydrophobic liquid, thereby producing a tack-free resinous film on the substrate. A novel coating composition is produced comprising microcapsules having a hydrophilic core material dispersed in a radiation curable hydrophobic liquid. A pressure-sensitive carbonless transfer sheet is produced comprising a substrate having a plurality of surfaces, at least one of the surfaces being coated with a tack-free resinous film comprising a radiation cured resin having dispersed therein microcapsules containing a hydrophilic liquid containing at least one chromogenic material, the chromogenic material being soluble in the hydrophilic liquid.

7 Claims, No Drawings

PROCESS FOR PRODUCING A PRESSURE-SENSITIVE CARBONLESS COPY SHEET USING MICROCAPSULES FORMED IN SITU IN A RADIATION CURABLE BINDER

This is a division of application Ser. No. 773,901 filed Mar. 3, 1977 now abandoned.

BACKGROUND OF THE INVENTION

The invention relates to the production of radiation curable microcapsular coating compositions. In particular, it relates to the production of microcapsules containing a hydrophilic core by interfacial reaction, the microcapsules being dispersed in a hydrophobic liquid in which the hydrophobic liquid is a radiation curable organic liquid. In a preferred form of this invention, the encapsulated hydrophilic liquid contains a chromogenic material soluble in the hydrophilic liquid. The dispersion of microcapsules can be coated on a substrate and cured by radiation to give a pressure-sensitive carbonless copy sheet having a transfer coating. For purposes of this application, the term "chromogenic" shall be understood to refer to materials such as color precursors, color developers and color formers.

Transfer coatings in which a chromogenic material is dissolved in a hydrophilic liquid and encapsulated in a hydrophobic liquid by means of an interfacial reaction are described in U.S. Pat. No. 3,432,427 to Kan et al. The process described in this patent, as it pertains to the formation of microcapsules containing a hydrophilic liquid, involves the incorporation of one color former or color producing substance of a color producing pair in the hydrophilic liquid. Also included in this hydrophilic liquid is a wall-forming material which reacts with another wall-forming material present in a hydrophobic liquid to form a polymer film insoluble in either the hydrophilic or hydrophobic liquids. The microcapsules are formed by emulsifying the hydrophilic liquid into the hydrophobic liquid and allowing the two wall-forming materials to react at the interface of the hydrophilic and hydrophobic liquids. The resultant microcapsules are obtained as a dispersion of microcapsules in the hydrophobic liquid which may be a volatile organic solvent or a non-volatile oil.

Carbonless copy paper, briefly stated, is a standard type of paper wherein during manufacture the backside of the paper substrate is coated with what is referred to as a CB or transfer coating, the CB coating containing one or more chromogenic materials, generally in capsular form. At the same time the front side of the paper substrate is coated during manufacture with what is referred to as a CF coating, which contains one or more chromogenic materials capable of producing a color with the encapsulated CB chromogenic material. Both the chromogenic materials remain in the coatings on the respective back and front surfaces of the paper in substantially colorless form. This is true until the CB and CF coatings are brought into overlying relationship and sufficient pressure, as by a typewriter, is applied to rupture the CB coating to release the encapsulated chromogenic material. At this time the chromogenic material contacts the CF coating and reacts with the chromogenic material therein to form a colored image. Carbonless copy paper has proved to be an exceptionally valuable image transfer media for a variety of reasons, only one of which is the fact that until a CB coating is placed next to a CF coating both the CB and the CF coatings are in an inactive state as the co-reactive elements are not in contact with one another. Patents relating to carbonless copy paper products are:

U.S. Pat. No. 2,712,507 (1955) to Green
U.S. Pat. No. 2,730,456 (1956) to Green et al
U.S. Pat. No. 3,455,721 (1969) to Phillips et al
U.S. Pat. No. 3,466,184 (1969) to Bowler et al
U.S. Pat. No. 3,672,935 (1972) to Miller et al A disadvantage of coated paper products such as carbonless transfer papers stems from the necessity of applying a liquid coating composition containing the color forming ingredients during the manufacturing process. In the application of such coatings, volatile organic solvents are sometimes used which then in turn requires evaporation of excess solvent to dry the coating thus producing volatile solvent vapors. An alternate method of coating involves the application of the color forming ingredients in an aqueous slurry, again requiring removal of excess water by drying. Both methods suffer from serious disadvantages. In particular, the organic solvent coating method necessarily involves the production of generally volatile solvent vapors, creating both a health and a fire hazard in the surrounding environment. When using an aqueous solvent system the water must be evaporated which involves the expenditure of significant amounts of energy. Further, the necessity of a drying step requires the use of complex and expensive apparatus to continuously dry a substrate which has been coated with an aqueous coating compound. A separate but related problem involves the disposal of polluted water. The application of heat not only is expensive, making the total paper manufacturing operation less cost effective, but also is potentially damaging to the chromogenic materials which are generally coated onto the paper substrate during manufacture. High degrees of temperature in the drying step require specific formulation of coating compositions which permit the use of excess heat. The problems encountered in the actual coating step are generally attributable to the necessity for a heated drying step following the coating operation.

The novel process and liquid coating compositions of this invention are superior to those used in the prior art microcapsular coating of substrates in that they do not need an organic solvent or water in their coating composition, thus avoiding the disadvantages associated with solvent removal during drying. The liquid radiation curable substance is a solvent for the wall-forming material in the hydrophobic liquid. The liquid radiation curable substance cures by radiation to give a tack-free film containing microcapsules. The cured film acts as a binder to adhere the microcapsules to the substrate.

In general, patents concerned with the production and application of liquid resin compositions containing no volatile solvent which are subsequently cured by radiation to a solid film are:

U.S. Pat. No. 3,551,235 (1970) to Bassemir et al
U.S. Pat. No. 3,551,246 (1970) to Bassemir et al
U.S. Pat. No. 3,551,311 (1970) to Nass et al
U.S. Pat. No. 3,558,387 (1971) to Bassemir et al
U.S. Pat. No. 3,661,614 (1972) to Bassemir et al
U.S. Pat. No. 3,720,534 (1973) to Macauley et al
U.S. Pat. No. 3,754,966 (1973) to Newman et al
U.S. Pat. No. 3,772,062 (1973) to Shur et al
U.S. Pat. No. 3,772,171 (1973) to Savageau et al
U.S. Pat. No. 3,801,329 (1974) to Sandner et al
U.S. Pat. No. 3,819,496 (1974) to Roskott et al
U.S. Pat. No. 3,847,768 (1974) to Kagiya et al U.S. Pat. No. 3,847,769 (1974) to Garratt et al
These compositions generally also contain a pigment or dye. Such resin compositions are useful for protective coatings and fast drying inks. U.S. Pat. No. 3,754,966 describes the production of an ink releasing dry transfer element which can be used as a carbon paper or typewriter ribbon. It is significant to note here that the particular radiation cured coating must be compatible with the reaction of CB and CF chromogenic materials to form a color. Such color forming reactions are generally of a sensitive or delicate nature and are not generally compatible with the compositions found in the prior art.

The novel liquid coating compositions of this invention contain microcapsules having an aqueous core liquid containing a chromogenic material in addition to a radiation curable hydrophobic liquid. Prior to the discovery of this invention, it was not known that such microcapsules could be produced in situ in radiation curable coating compositions and retain their color producing properties after the resin is cured by radiation to a tack-free film. For purposes of this disclosure, a tack-free film is one which will separate cleanly from a cotton ball lightly pressed against the film. The cotton fibers will not adhere to the film surface.

An especially preferred application of the process of this invention would be in the continuous production of a manifold carbonless form.

As can be appreciated from the above, the continuous production of a manifold paper product would require simultaneous coating, simultaneous drying, simultaneous printing, and simultaneous collating and finishing of a plurality of paper substrates. Thus, Busch in Canadian Pat. No. 945,443 indicates that in order to do so there would be a minimum wetting of the paper web by water during application of the CB emulsion coat. For that purpose a high solids content emulsion is used and special driers are described in Busch. However, because of the complexities of the drying step, this process has not been commercially possible to date. More particularly, the drying step involving solvent evaporation and/or water evaporation and the input of heat does not permit the simultaneous or continuous manufacture of manifold forms. In addition to the drying step which prevents continuous manifold form production the necessity for the application of heat for solvent evaporation is a serious disadvantage since aqueous and other liquid coatings require that special grades of generally more expensive paper be employed and even these often result in buckling, distortion or warping of the paper since water and other liquids tend to strike through or penetrate the paper substrate. Additionally, aqueous coatings and some solvent coatings are generally not suitable for spot application or application to limited areas of one side of a sheet of paper. They are generally suitable only for application to the entire surface area of a sheet to produce a continuous coating.

Another problem which has been commonly encountered in attempts to continuously manufacture manifold forms has been the fact that a paper manufacturer must design paper from a strength and durability standpoint to be adequate for use in a large variety of printing and finishing machines. This requires a paper manufacturer to evaluate the coating apparatus of the forms manufacturers he supplies in order that the paper can be designed to accommodate the apparatus and process designed exhibiting the most demanding conditions. Because of this, a higher long wood fiber to short wood fiber ratio must be used by the paper manufacturer than is necessary for most coating, printing or finishing machines in order to achieve a proper high level of strength in his finished paper product. This makes the final sheet product more expensive as the long fiber is generally more expensive than a short fiber. In essence, the separation of paper manufacturer from forms manufacturer, which is now common, requires that the paper manufacturer overdesign his final product for a variety of machines, instead of specifically designing the paper product for known machine conditions.

By combining the manufacturing, printing and finishing operations into a single on-line system a number of advantages are achieved. First, the paper can be made using ground wood and a lower long fiber to short fiber ratio as was developed supra. This is a cost and potentially a quality improvement in the final paper product. A second advantage which can be derived from a combination of manufacturing, printing and finishing is that waste or re-cycled paper hereinafter sometims referred to as "broke" can be used in the manufacture of the paper since the quality of the paper is not of an overdesigned high standard. Third and most importantly, several steps in the normal process of the manufacture of forms can be completely eliminated. Specifically, drying steps can be eliminated by using a non-aqueous, solvent-free coating system and in addition, the warehousing and shipping steps can be avoided, thus resulting in a more cost efficient product.

Additionally, by using appropriate coating methods, namely radiation curable coating compositions and methods, and by combining the necessary manufacturing and printing steps, spot printing and spot coating can be realized. Both of these represent a significant cost savings but nevertheless one which is not generally available when aqueous coatings are used or where the manufacture, printing and finishing of paper are performed as separate functions. An additional advantage of the use of radiation curable coating compositions and the combination of paper manufacturer, printer and finisher is that when the option of printing followed by coating is available significant cost advantages occur.

STATEMENT OF THE INVENTION

In one aspect of the invention, a process is provided for producing a coating composition containing microcapsules having a hydrophilic core material for use in the manufacture of pressure-sensitive carbonless transfer papers comprising the following steps of preparing a hydrophobic emulsion component by dispersing a first wall-forming material in a hydrophilic liquid containing at least one chromogenic material, the chromogenic material being soluble in the hydrophilic liquid, the first wall-forming material being reactive with a second wall-forming material to form a polymeric capsule wall, the capsule wall being substantially insoluble in the hydrophilic and the hydrophobic liquids, and mixing the hydrophobic emulsion component with the hydrophilic emulsion component to form an emulsion containing droplets of the hydrophilic emulsion component dispersed in the hydrophobic emulsion component. The second wall-forming material is then added to the emulsion with agitation, the agitation continuing for a period of time sufficient to allow the first and second wall-forming materials to react to form a dispersion of microcapsules in the hydrophobic emulsion component, the microcapsules having cell walls substantially impermeable to the hydrophobic and the hydrophilic liquids.

In another aspect of the invention, a process is provided for producing a pressure-sensitive carbonless transfer paper comprising the further steps of applying the coating composition to a substrate and curing the coating composition by subjecting the coating composition on the substrate to radiation for a period of time sufficient to cure the radiation curable hydrophobic liquid, thereby producing a tack-free resinous film on the substrate.

In a further aspect of the invention, a novel coating composition is produced comprising microcapsules having a hydrophilic core material dispersed in a radiation curable hydrophobic liquid.

In a still further aspect of the invention, a pressure-sensitive carbonless transfer sheet is produced comprising a substrate having a plurality of surfaces, at least one of the surfaces being coated with a tack-free resinous film comprising a radiation cured resin having dispersed therein microcapsules containing a hydrophilic liquid containing at least one chromogenic material, the chromogenic material being soluble in the hydrophilic liquid.

Detailed Description of the Invention

The coating composition of this invention is essentially a dispersion of microcapsules containing a chromogenic material or materials dissolved in a hydrophilic liquid in a radiation curable hydrophobic liquid as a continuous phase. The dispersion of microcapsules is prepared in situ by interfacial reaction of wall-forming material present in droplets of the hydrophilic liquid with wall-forming material in the radiation curable hydrophobic liquid.

The coating composition can contain additional materials which function as photoinitiators. Addition of these materials depends upon the particular method of curing the microcapsular coating. Filler materials can also be added to modify the properties of the cured film. The use of nonreactive solvents for the radiation curable liquid, which require heat to remove them during the drying or curing of the coated film, is avoided. However, minor amounts of non-reactive solvents can be tolerated without requiring a separate step for drying during any subsequent curing step. Although the product and process of this invention are useful in the manufacture of a variety of microencapsulated products, the preferred use of the process and product of this invention is in the production of a pressure-sensitive carbonless transfer sheets such as is described in commonly assigned co-pending U.S. Application Ser. No. 684,462, filed May 7, 1976.

In general, the hydrophilic liquids known in the art, as illustrated by those listed in U.S. Pat. No. 3,432,427 to Kan et al, can be used in the practice of this invention. Examples of the preferred hydrophilic liquids are water, glycerin, 1,4-butanediol, polyethylene glycol, 1,2-propylene glycol, 1,3-butylene glycol, polypropylene glycol, triethylene glycol, triethylene glycol monomethyl ether, diethylene glycol, ethylene diamine, triethylene diamine, diethylene triamine, triethylene tetramine, tetraethylene pentamine, polyethylenimine and mixtures thereof.

In the preferred use of this invention to prepare pressure-sensitive transfer sheets, the most preferred hydrophilic liquid is a mixture of water and glycerin. The hydrophilic liquid also contains at least one chromogenic material dissolved therein. Besides being soluble in the hydrophilic liquid, the chromogenic materials should be essentially insoluble in the hydrophobic liquid and should not be substantially reactive to any appreciable degree with the other ingredients of the coating composition, such as the hydrophilic liquid, the radiation curable substance and the wall-forming materials. The chromogenic material can be selected from any color-forming pair in which one chromogenic material reacts with another chromogenic material in the presence of the hydrophilic liquid to form a color. Following are pairs in which the first mentioned chromogenic material is particularly useful in the practicing of this invention. A most preferred chromogenic material is sodium orthovanadate.

| Color Former Pairs | COLOR |
|---|---|
| Ammonium ferric sulfate - Potassium terrocyanide | Blue |
| Ammonium ferric sulfate - Potassium thiocyanate | Red brown |
| Ammonium ferric sulfate - Salicylaldoxime | Brown |
| Ammonium ferric sulfate - Gallic acid | Black |
| Ammonium ferric sulfate - Tannic acid | Black |
| Ammonium ferric sulfate - Catechol | Black |
| Ammonium ferric sulfate - 8-Hydroxyquinoline | Black |
| Ferric oleate - Catechol | Violet-Black |
| Ferric oleate - Sodium diethyldithiocarbonate | Black |
| Sodium orthovanadate - 2-Ethylhexyl gallate | Black |
| Sodium orthovanadate - Gallic acid | Black |
| Ammonium metavanadate - Gallic acid | Black |
| Ammonium metavanadate - Tannic acid | Black |
| Ferric sulfate - 2,4-dinitro-1-naphthol | Black |
| Cupric sulfate - Dithioxamide | Black |
| Cupric oleate - Dithioxamide | Black |

The chromogenic materials are present in the hydrophilic liquid in an amount from about 0.2% to 10% based on the weight of the hydrophilic liquid. The most preferred range is about 0.5% to about 4.0%.

The hydrophilic liquid contains a first wall-forming material which reacts with a second wall-forming material in the hydrophobic liquid to form a polymeric capsule wall which is substantially insoluble in both the hydrophilic and hydrophobic liquids. The first wall-forming materials may be solids which can be dispersed or dissolved in the hydrophilic liquid or they can be part of the hydrophilic liquid itself. Referring to the examples of the preferred hydrophilic liquids listed supra, these same compounds are the preferred first wall-forming materials. The preferred second wall-forming materials are the compounds containing polyfunctional isocyanate groups. These include the diisocyanates, the triisocyanates and other compounds and prepolymers containing more than one isocyanate group in each molecule. The first wall-forming material and second wall-forming material are present in such amounts that there will always be unreacted first wall-forming material to serve as the hydrophilic liquid of the microcapsules.

The radiation curable liquids useful in the practice of this invention comprises the free radical polymerizable ethylenically unsaturated organic compounds. These compounds contain at least one terminal ethylenically unsaturated group per molecule. These compounds are hydrophobic liquids and function as an inert continuous hydrophobic phase during the in situ preparation of the microcapsules and as a dispersing media for the microcapsules and other ingredients of the coating composition prior to the coating operation. They are non-reactive with the wall-forming materials and they are curable to a solid resin when exposed to ionizing or ultraviolet radiation. Thus the cured resin acts as a binder for the microcapsules to a substrate such as paper. A group of useful radiation curable compounds are the polyfunctional ethylenically unsaturated organic compounds which have more than one (two or more) terminal ethylenic groups per molecule. Due to the polyfunctional nature of these compounds, they cure rapidly under the influence of radiation by polymerization, including crosslinking, to form a hard dry tack-free film.

Included in this preferred group of radiation curable compounds are the polyesters of ethylenically unsaturated acids such as acrylic acid and methacrylic acids, and a polyhydric alcohol. Examples of some of these polyfunctional compounds are the polyacrylates or methacrylates of trimethylolpropane, pentaerythritol, dipentaerythritol, ethylene glycol, triethylene glycol, propylene glycol, glycerin, sorbitol, neopentylglycol and 1,6-hexanediol, hydroxy-terminated polyesters, hydroxy-terminated epoxy resins, and hydroxy-terminated polyurethanes and polyphenols such as bisphenol A.

Also included in this group are polyallyl and polyvinyl compounds such as dillayl phthalate and tetrallyloxyethane, and divinyl adipate, butane divinyl ether and divinylbenzene. Mixtures of these polyfunctional compounds and their oligimers and prepolymers may be used if desired.

A group of radiation curable compounds which are useful are the monofunctional ethylenically unsaturated organic compounds which have one terminal ethylenic group per molecule. Examples of such monofunctional compouns are the $C_2$ to $C_{16}$ alcohol esters of acrylic and methacrylic acid, and styrene, substituted styrenes, vinyl acetate, vinyl ethers and allyl phenols. In general, these compounds are liquid and have a lower viscosity than the polyfunctional ethylenically unsaturated compounds and thus may be used to reduce the viscosity of the coating composition to facilitate migration of the wall-forming materials during preparation of the microcapsules. These compounds are radiation curable and react with the ethylenically unsaturated polyfunctional organic compounds during radiation curing to give a dry flexible film. Compounds having only one terminal ethylenic group may be used alone as the radiation curable substance. However, the resultant radiation cured film may be rather soft and pliable and hence less preferred cmmercially than other ethylenically unsaturated compounds.

The preferred radiation curable hydrophobic liquid is a mixture containing one or more monofunctional compounds and one or more polyfunctional compounds. The monofunctional compounds due to their generally lower viscosity, tend to more easily disperse the hydrophilic liquid into droplets of the desired size. The polyfunctional compounds tend to cure more rapidly and due to crosslinking give a harder tougher resin film. This is particularly so when compounds of higher molecular weight, such as the oligimers and prepolymers of the polyfunctional compounds, are used. In a preferred process of this invention the lower viscosity monofunctional compounds are used as the dispersing media for the preparation of the microcapsules and the higher viscosity faster curing polyfunctional compounds, particularly the oligimers and prepolymers of these compounds, are added after the microcapsules are formed and prior to coating on a substrate.

The radiation curable hydrophobic liquid can be present in the microcapsular coating composition in an amount of from about 25% to about 75% by weight of the composition. The preferred range is from about 35% to about 65%, and the most preferred range is from about 40% to about 55%.

A photoinitiator is added to the coating composition if the composition is to be cured by ultraviolet radiation. A wide variety of photoinitiators are available which serve well in the system described in this invention. The preferred photoinitiators are the benzoin alkyl ethers, such as Vicure 30 (a mixture of alkylbenzoin ethers manufactured and sold by Stauffer Chemical Co., Westport, Conn.), benzoin butyl ether (Vicure 10, Stauffer), benzoin methyl ether, and $\alpha,\alpha$-diethoxyacetophenone. Other photoinitiators which can be used are benzophenone, 4,4'-bis(dimethylamino)benzophenone, ferrocene, xanthone, thioxanthane, $\alpha,\alpha$-azobisisobutylnitrile, decabromodiphenyl oxide, pentabromomonochlorocyclohexane, pentachlorobenzene, polychlorinated biphenyls such as the Arochlor 1200 series (manufactured and sold by Monsanto Chemical Co., St. Louis, Missouri), benzoin ethyl ether, 2-ethyl anthroquinone, 1-(chloroethyl) napthalene, desyl chloride, chlorendic anyhydride, naphthalene sulfonylchloride and 2-bromoethyl ethyl ether. The amount of photoinitiator added can be from about 0.2% to about 10% by weight of the coating composition, with a preferred range being from about 1% to about 8% by weight.

Photoinitiation synergists can also be added to the ultraviolet curable coating compositions. Photoinitiation synergists serve to enhance the initiation efficiency of the photoinitiators. The preferred synergists are the chain transfer agents, such as the tertiary alcoholmines and substituted morpholines, triethanolamine, N-methyldiethanolamine, N,N-dimethylethanolamine and N-methylmorpholine. The amount of photoinitiation synergist added can be from about 0.2% to about 10% by weight of the coating composition, with a preferred range of from about 3% to about 8% by weight.

In the preparation of the microcapsules, a hydrophobic emulsion component is prepared by dissolving or dispersing an emulsifier in the radiation curable hydrophobic liquid. As noted later, the second wall-forming material may then be added to the radiation curable hydrophobic liquid if desired material in water and adding to this a first wall-forming material which is soluble or miscible in water. Preparation of each of these emulsion components is easily accomplished by stirring together at room temperature the materials of each component. The Brookfield viscosity of the first emulsion can be from about 0.5 cps. to about 1000 cps. The preferred viscosity is about 1 cps. to about 500 cps. and the most preferred viscosity is from about 1 cps. to about 50 cps.

The hydrophobic and hydrophilic emulsion components, which are two immiscible liquids, are then mixed together with high agitation to form droplets of the hydrophilic emulsion component in the hydrophobic emulsion component. The hydrophilic emulsion component contains a hydrophilic carrier liquid and dissolved therein the chromogenic material and a first wall-forming material. The hydrophobic emulsion component contains radiation curable hydrophobic liquid and an emulsifying agent. At this point the hydrophilic emulsion component may or may not contain the second wall-forming material. As noted supra, this material can be added to the hydrophobic emulsion component prior to emulsification or it may be added to the emulsion after emulsification. To facilitate mixing the second wall-forming material may be dissolved in additional radiation curable hydrophobic liquid prior to this addition. In any event the second wall-forming material must be soluble in the radiation curable hydrophobic liquid and substantially not soluble in the hydrophilic emulsion component.

After emulsification, the emulsion is stirred for a period of about 3 hours to about 15 hours to allow the first and second wall-forming materials to react and form a dispersion of microcapsules having cell walls which are substantially impermeable to both the hydrophilic and hydrophobic liquids. The microcapsules are preferably from about 1 micron to about 30 microns in diameter.

In a preferred embodiment of the process of this invention, the radiation curable hydrophobic liquid is divided into two portions and the first portion is present in the hydrophobic emulsion component prior to the emulsification step. A second portion of the radiation curable hydrophobic liquid containing, in particular, faster curing polyfunctional oligimers and prepolymers may be added after the microcapsules are formed. At this point, other materials such as the photoinitiators and photoinitiation synergists may be added to give a coatable compositions. Stilt material may be added, if desired, to prevent premature rupture of the microcapsules.

The microcapsular coating composition can be added to a substrate, such as paper or a plastic film by any of the common paper coating processes such as roll, air knife, or blade coating, or by any of the common printing processes, such as offset, gravure, or flexographic printing. The rheological properties, particularly the viscosity, of the coating composition, can be adjusted for each type of application by proper selection of the type, molecular weight and relative amounts of the liquid radiation curable compounds.

These coating compositions can be cured by any free radical initiated chain propagated addition polymerization reaction of the terminal ethylenic groups of the radiation curable compounds. These free radicals can be produced by several different chemical processes including the thermal or ultraviolet induced degradation of a molecular species and any form of ionizing radiation such as alpha-particles, beta-rays (high-energy electrons), gamma-rays, X-rays and neutrons.

The preferred curing process is by exposure of the coating composition to ultraviolet radiation having a wavelength of about 2000 Å to about 4000 Å. For curing to occur the composition must contain suitable ultraviolet absorbing photoinitiators which will produce polymerization initiating free radicals upon exposure to the radiation source. A typical ultraviolet source suitable for this type of curing process is a Hanovia 200 watt medium pressure mercury lamp. Curing efficiencies of the coating composition are dependent on such parameters as the nature of the radiation curable substance, atmosphere in contact with the coating, quantum efficiency of the radiation absorbed, thickness of coating and inhibitory effects of the various materials in the composition.

In the ionizing radiation induced curing of these coating compositions a specific radiation absorbing material (photoninitiator) is not necessary. Exposure of the coating composition to a source of high energy electrons results in spontaneous curing of the composition to a tough, tack-free coating. Any of a number of commercially available high energy electron beam or linear cathode type high energy electron sources are suitable for curing these compositions. Parameters such as the atmospheric environment and inhibitory effects of the various materials in the composition play an important role in the determination of the curing efficiency of these compositions.

The following examples further illustrate but do not limit the invention.

EXAMPLE 1

In 20 parts of distilled water was dissolved 1.4 parts of vanadium pentoxide, 2.6 parts of sodium hydroxide, and 40 parts of glycerin (Liquid A).

To 100 parts of 2-ethylhexyl acrylate was added 1.0 part of a mixture of glycerol stearate and polyoxyethylene stearate (an emulsifying agent sold under the trade name Arlacel 165 by I.C.I., Americas, Inc., Wilmington, Delaware) and stirred at room temperature. A cloudy mixture (Liquid B) was obtained. The Brookfield viscosity of Liquid B at 25° C. was 12 centipoise.

A solution of 12 parts of Mondur CB-75 (a 75% solution in ethyl acetate of a prepolymer of toluene diisocyanate and trimethylolpropane made and sold by Mobay Chemical Co., Pittsburgh, Pennsylvania) in 12 parts of n-butyl acetate was added to 50 parts of 2-ethylhexyl acrylate at room temperature. A clear solution (Liquid C) was obtained.

Liquid B was placed in a Waring blender. Liquid A was slowly added to Liquid B in the Waring blender while running at high speed. The emulsification was continued for 1 minute. Then Liquid C was slowly added to the Waring blender. After 3 more minutes of emulsification time the mixture was transferred to a 3-neck glass reactor which was equipped with a condenser and a mechanical stirrer. The emulsion was stirred overnight to yield a dispersion of microcapsules.

To 9.7 parts of this microcapsular dispersion was added 0.3 parts of desyl chloride which is a photoinitiator and the mixture was applied on a sheet of hydroxypropylcellulose base coated paper with a 19 Mayer bar. The sheet was finally exposed to ultraviolet light which was generated by a Hanovia 200 watts medium pressure, 4-½" mercury arc lamp, 6" from the lamp. The resulting sheet performed well as the CB part of the carbonless copy paper system in which the developer sheet was coated with 2-ethylhexyl gallate.

EXAMPLE 2

This is an example of the preparation of microcapsules in which neopentyl glycol diacrylate (a difunctional monomer) was used as one ingredient of the continuous phase.

The procedure of Example 1 was employed with the exception that 100 parts of 2-ethylhexyl acrylate in Liquid B was replaced by 70 parts of 2-ethylhexyl acrylate and 30 parts of neopentyl glycol diacrylate. Microcapsules so prepared were suitable for use in making the transfer sheet of carbonless copy paper systems using a 2-ethylehexyl gallate developer sheet.

EXAMPLE 3

This is an example of the use of a trifunctional crosslinking agent. The procedure is the same as Example 2 except that 30 parts of trimethylol propane triacrylate were used instead of 30 parts of neopentyl glycol triacrylate. The microcapsules prepared were coated on paper and performed well as the transfer sheet of a carbonless copy paper system using a 2-ethylhexyl gallate developer sheet.

EXAMPLE 4

This is an example of a higher solids system. The procedure was carried out as in Example 1 with the exception that double the amounts of Liquid A, Mondur CB-75 and n-butyl acetate were employed. The microcapsules produced were coated on a piece of paper and performed well as the CB part of a carbonless copy paper system in which the CF sheet was coated with 2-ethylhexyl gallate.

EXAMPLE 5

In 22.5 parts of distilled water, 1.575 parts of vanadium pentoxide, 2.925 parts of sodium hydroxide, 45 parts of glycerin, and 30 parts of sodium bromide were dissolved (Liquid A). To 150 parts of 2-ethylhexyl acrylate was added 1.5 parts of Arlacel 165 and stirred at room temperature. A cloudy mixture (Liquid B) was obtained.

In 75 parts of 2-ethylhexyl acrylate, 5.3 parts of Desmodur N-100 and 3.5 parts of Desmodur E-21 were dissolved (Liquid C). (Desmodur N-100 is a liquid biuret made by reacting hexamethylene diisocyanate with water in a 3 to 1 molar ratio and Desmodur E-21 is an aromatic polyisocyanate prepolymer. Both Desmodur N-100 and E-21 are made and sold by Mobay Chemical Co., Pittsburgh, Pennsylvania.) The same procedure as in Example 1 was repeated except that benzoin methyl ether replaced desyl chloride as the photoinitiator, and the microcapsular dispersion was cured by ultraviolet light which was generated by the Ultraviolet AC 1202 AN Processor (manufactured and sold by Radiation Polymer Co., a division of PPG Industries, Pittsburgh, Pennsylvania). The transfer sheet so produced performed satisfactorily as a part of a carbnonless paper system using a 2-ethylhexyl gallate coated second sheet.

EXAMPLE 6

In 30 parts of distilled water, 2.1 parts of vanadium pentoxide, 3.9 parts of sodium hydroxide, 60 parts of glycerin, and 40 parts of sodium bromide were dissolved (Liquid A).

To 175 parts of 2-ethylhexyl acrylate was added 2 parts of Arlacel 165. The cloudy mixture resulting was cooled to about 5° C., the 30 parts of Mondur CB-60 (a 61% solution in a mixture of xylene and ethyl-glycol acetate of a toluene diisocyanate-based addent made and sold by Mobay Chemical Co., Pittsburgh, Pennsylvania) was dissolved to give Liquid B.

Liquid A was then emulsified into Liquid B for 4 minutes in a Waring blender at low speed. This emulsion was then transferring into a glass reactor to cure overnight at 40° C. to 46° C. with mild stirring. The resultant mixture was examined by a microscope. The capsules were good with size of about 7 to 12 microns.

9 Parts of this microcapsular dispersion was weighed out and 0.7 parts of a methyl methacrylate copolymer (Acryloid B-82 made and sold by Rohm and Haas Co.) and 0.3 parts Vicure 30 were dissolved. The mixture was then coated by a 19 Mayer bar onto a polyvinyl alcohol base coated paper and cured by ultraviolet light which was generated by Ultraviolet QC 1202 AN Processor. This resulting transfer sheet was then typed against a record sheet which was coated with 2-ethylhexyl gallate to give very good black images.

EXAMPLES 7 and 8

The following coating formulations were also made, applied to paper and surface cured by an electron beam unit at Radiation Polymer Co., which was operated at 5 megarads, 300 KV, and a speed of 30 ft. per min. using either an air atmosphere or a nitrogen atmoshpere:

| Example No. | 7 | 8 |
| --- | --- | --- |
| Microcapsule Mixture (Example 1) | 8 | 8 |
| Acryloid B-82(Methyl methacrylate copolymer) | 1.5 | 1.5 |
| Ethyl hydroxyethylcellulose (Low Ml) | 0.2 | 0.2 |
| Triethanolamine | 0.3 | — |

The paper of Example 7 was cured after 2 passes using air. The paper of example 8 was cured after 1 pass using air and 1 pass using nitrogen.

Both sheets of Examples 7 and 8 performed well as a part of a carbonless paper system using a 2-ethylhexyl gallate coated second sheet.

What is claimed is:

1. A process for producing a pressure-sensitive carbonless transfer paper comprising the steps of:
   (a) preparing a liquid radiation curable hydrophobic emulsion component by dispersing an emulsifier in a radiation curable hydrophobic liquid;
   (b) preparing a liquid hydrohilic emulsion component by dispersing a first wall-forming material in a hydrophilic liquid containing at least one chromogenic material, said chromogenic material being soluble in said hydrophilic liquid, said first wall-forming material being reactive with a second wall-forming material to form a polymeric capsule wall, said polymeric capsule wall being substantially insoluble in said liquid radiation curable hydrophobic and said liquid hydrophilic emulsion components;
   (c) mixing said liquid radiation curable hydrophobic emulsion component with said liquid hydrophilic emulsion component to form an emulsion containing droplets of said liquid hydrophilic emulsion component dispersed in said liquid radiation curable hydrophobic emulsion component;
   (d) adding said second wall-forming material to said emulsion with agitation, said agitation continuing for a period of time sufficient to allow said first and second wall-forming materials to react to form a dispersion of microcapsules in said liquid radiation curable hydrophobic emulsion component, said microcapsules having cell walls substanatially impermeable to said liquid hydrophobic and said liquid hydrophilic emulsion components;
   (e) applying said dispersion of said microcapsules to a substrate; and
   (f) curing said dispersion of said microcapsules by subjecting said dispersion of said microcapsules on said substrate to radiation for a period of time sufficient to cure said dispersion of said microcapsules by polymerization of said liquid radiation curable hydrophobic emulsion component, thereby producing a tack-free resinous film on said substrate substantially without removal of solvents or other liquids.

2. The process of claim 1 in which said radiation curable hydrophobic liquid comprises at least one ethylenically unsaturated organic compound having at least one terminal ethylenic group per molecule.

3. The process of claim 1 in which said radiation curable hydrophobic liquid comprises a mixture of ethylenically unsaturated organic compounds, a portion of said compounds having one terminal ethylenic group per molecule and another portion of said compounds having more than one terminal ethylenic group per molecule.

4. The process of claim 1 in which said first wall-forming material is a polyol and said second wall-forming material is a polyisocyanate.

5. A process for producing a pressure-sensitive carbonless transfer paper comprising the steps of:
 (a) preparing a liquid radiation curable hydrophobic emulsion component by dispersing an emulsifier in a first portion of a radiation curable hydrophobic liquid, said liquid hydrophobic emulsion component having a viscosity from about 1 centipose to about 500 centipoise, said radiation curable hydrophobic liquid comprising at least one ethylenically unsaturated organic compound having at least one terminal ethylenic group per molecule;
 (b) preparing a liquid hydrophilic emulsion component by dispersing a polyol in a hydrophilic liquid containing at least one chromogenic material, said chromogenic material being soluble in said hydrophilic liquid, said polyol being reactive with a polyisocyanate to form a polymeric capsule wall, said polymeric capsule wall being substantially insoluble in said liquid hydrophilic and said liquid radiation curable hydrophobic emulsion components
 (c) mixing said liquid radiation curable hydrophobic emulsion component with said liquid hydrophilic emulsion component to form an emulsion containing droplets of said liquid hydrophilic emulsion component dispersed in said liquid radiation curable hydrophobic emulsion component;
 (d) adding said polyisocyanate to said emulsion with agitation, said agitation continuing for a period of time sufficient to allow said polyol and said isocyanate to react to form a dispersion of microcapsules in said liquid radiation curable hydrophobic emulsion component, said microcapsules having cell walls substantially impermeable to said liquid hydrophobic and said liquid hydrophilic emulsion components;
 (e) adding to said dispersion of said microcapsules in said liquid hydrophobic emulsion component a second portion of a radiation curable hydrophobic liquid, said second portion including at least one ethylenically unsaturated organic compound having more than one terminal ethylenic group per molecule;
 (f) applying said dispersion of said microcapsules onto a paper substrate; and
 (g) curing said dispersion by subjecting said dispersion onto said paper substrate to radiation for a period of time sufficient to cure said dispersion of said microcapsules by polymerization of said liquid radiation curable hydrophobic emulsion component, thereby producing a tack-free coating on said paper substrate substantially without removal of solvents or other liquids.

6. The process of claim 5 in which a photoinitiator and a photoinitiation synergist are added to said dispersion of microcapsules prior to said coating step and said radiation is ultraviolet light.

7. A process for producing a pressure-sensitive carbonless transfer paper comprising the steps of:
 (a) preparing a liquid hydrophilic emulsion component by dispersing a first wall-forming material in a hydrophilic liquid containing at least one chromogenic material, said chromogenic material
 (b) preparing a liquid radiation curable hydrophobic emulsion component by dispersing an emulsifier in a radiation curable hydrophobic liquid containing said second wall-forming material, said first wall forming material being reactive with said second wall forming material to form a polymeric capsule wall, said polymeric capsule wall being substantially insoluble in said liquid radiation curable hydrophobic and said liquid hydrophilic emulsion components.
 (c) mixing said liquid radiation curable hydrophobic emulsion component with said liquid hydrophilic emulsion component to form an emulsion containing droplets of said liquid hydrophilic emulsion component dispersed in said liquid radiation curable hydrophobic emulsion component;
 (d) agitating said emulsion for a period of time sufficient to allow said first and second wall-forming materials to react to form a dispersion of microcapsules in said liquid radiation curable hydrophobic emulsion component, said microcapsules having cell walls substantially impermeable to said liquid hydrophobic and said liquid hydrophilic emulsion components;
 (e) applying said dispersion of said microcapsules to a substrate; and
 (f) curing said dispersion of said microcapules by subjecting said dispersion of said microcapsules on said substrate to radiation for a period of time sufficient to cure said dispersion of said microcapsules by polymerization of said liquid radiation curable hydrophobic emulsion component, thereby producing a tack-free resinous film on said substrate substantially without removal of solvents or other liquids.

* * * * *